United States Patent [19]

Robbins, III

[11] Patent Number: 5,013,517
[45] Date of Patent: May 7, 1991

[54] METHOD OF BLOW MOLDING INTEGRAL PRESS-LOCK CONTAINER

[76] Inventor: Edward S. Robbins, III, 459 N. Ct., Florence, Ala. 26360

[21] Appl. No.: 102,612

[22] Filed: Sep. 30, 1987

Related U.S. Application Data

[63] Continuation-in-part of Ser. No. 8,658, Jan. 30, 1987, abandoned.

[51] Int. Cl.⁵ .............. B29C 49/04; B29C 49/22; B29C 49/52
[52] U.S. Cl. ................ 264/515; 264/523; 264/541; 425/525; 425/532
[58] Field of Search .......... 264/541, 540, 523, 173, 264/514; 383/63; 425/525, 532

[56] References Cited

U.S. PATENT DOCUMENTS

| | | | |
|---|---|---|---|
| 3,291,177 | 12/1966 | Naito | 383/63 |
| 3,312,766 | 4/1967 | Stevens | 264/541 |
| 3,339,606 | 9/1967 | Kugler | 383/63 |
| 3,608,032 | 9/1971 | Boultinghouse | 264/138 |
| 3,914,366 | 10/1975 | Wilson | 264/541 |
| 4,186,786 | 2/1980 | Kirkpatrick | 383/63 |
| 4,432,718 | 2/1984 | Wurzer | 264/541 |
| 4,479,244 | 10/1984 | Ausnit | 383/63 |
| 4,654,878 | 3/1987 | Lems | 383/63 |
| 4,658,433 | 4/1987 | Savicki | 383/63 |
| 4,736,496 | 4/1988 | Fisher et al. | 383/63 |
| 4,756,629 | 7/1988 | Tilman et al. | 383/63 |

FOREIGN PATENT DOCUMENTS

4219955 10/1967 Japan .................. 264/540

*Primary Examiner*—Jan H. Silbaugh
*Assistant Examiner*—Neil M. McCarthy

[57] ABSTRACT

Blow molded container and related process are provided wherein a container having at least an upper, non-self-supporting, flexible portion is blow molded to include an integral press-lock type closure about its upper open end. The blow mold cavity is formed to provide a rib or bead about one-half the periphery of the container open end, and a hollow recess about the other one-half of the periphery of the container open end. the upper end of the finished container may be flattened along its upper edge and closed by pressing the rib into the recess. It one embodiment of the invention, the lower portion of the container may be of greater thickness, but nevertheless integral with the upper portion, so as to be stable or self-supporting. In another embodiment, the container may be non-self-supporting throughout while, in still another embodiment, the container may be self-supporting throughout its length.

15 Claims, 4 Drawing Sheets

METHOD OF BLOW MOLDING INTEGRAL PRESS-LOCK CONTAINER

RELATED APPLICATIONS

This application is a continuation-in-part of my co-pending U.S. application, Ser. No. 008,658, filed Jan. 30 1987, now abandoned, the contents of which are hereby incorporated by reference.

BACKGROUND AND SUMMARY OF THE INVENTION

This invention relates to containers and methods for forming reusable and/or disposable plastic containers.

In my earlier filed co pending application there is disclosed a container construction comprised of upper and lower portions, the lower portion including self-supporting side walls and a bottom wall, and the upper portion including a flexible and non-self-supporting portion, whereby the container is able to stand in an upright orientation, while the upper portion may be gathered and closed in the manner of a thin film bag. To this end, the side walls of the lower portion are preferably formed of a plastic material of predetermined thickness, greater than the thickness of the upper portion. The wall thickness of the lower portion can also be modified as desired so as to be sufficient to avoid puncturing by materials disposed within the container, and to afford sufficient strength and rigidity to maintain the container in its intended configuration without significant distortion or flexing.

The upper portion of the container preferably constitutes a flexible, integral extension of the side walls of the lower portion. That is, the side walls and the upper portion are of unitary one-piece plastic construction, one with the other, with the upper portion constituting a thin film of plastic material forming a continuation of the side walls. The flexible upper portion terminates in a free end which, in accordance with this continuation-in-part application, may be provided with an integral press-lock closure by which the open end of the container may be closed, opened and reclosed as desired.

The container of this invention is preferably formed by blow-molding. Blow molding is a well known technique for forming hollow objects wherein air, and sometimes nitrogen, is used to expand an extruded parison within a female mold cavity. Within the blow molding art generally, three specific processes are employed: injection blow molding, stretch blow molding, and extrusion blow molding.

In a typical injection blow molding process for forming, for example, a small bottle, a plastic resin in molten form is injected into a preform mold to form a parison. Typically, the preform mold is shaped to provide an accurate, finished neck area and a partially shaped body portion The preform is then transferred to a blow mold where the preformed neck area is confined and the body portion expanded or blown to its final desired shape. While this process is particularly useful for small plastic bottles wherein at least a portion of the bottle neck has an intricate or complex design detail, usually in the neck area, it is nevertheless a costly process, primarily because of the detailed tooling configurations required.

In stretch blow molding, an extruded parison is stretched longitudinally prior to blow molding within a closed mold cavity.

Extrusion blow molding, on the other hand, is a less costly process typically used for forming large containers, tanks, etc. In the extrusion blow molding process, melted plastic resin is extruded, usually as a tubular parison, into free air and thereafter clamped between a pair of mold halves which together define a mold cavity. A blow pin is then inserted into the interior of the mold (typically through what will become the open container end) for supplying air which expands the parison against the interior surfaces of the mold cavity.

It is also known in the prior art to attach, such as by heat sealing, separately extruded closure strips along the open end of a thin film bag or container. Here again, however, multiple manufacturing and assembly steps are required.

It has now been discovered that an extrusion blow molding process may be employed to form a container as disclosed in my prior co-pending application which also includes an integral press-lock closure which is considerably less costly and simpler to manufacture than the multiple step processes of the prior art.

Specifically, in the process aspect of this invention, the plastic material is extruded from a die head to form a tubular parison. When extruding the material, the die head preferably extrudes a relatively thick first parison section which eventually will form the lower, self-supporting portion of the container. The die head is then adjusted, automatically, to extrude a thinner second parison section which eventually will form the upper flexible portion of the container. The die head is then adjusted again to extrude a thicker third parison section, having a wall thickness substantially identical to the first parison section, and which will ultimately form the integral press-lock closure portion of the container. After extrusion, opposed mold platens are moved into position on either side of the parison, and are then closed to clamp the parison within the mold. After the parison has been severed just above the mold, a blow pin or other suitable air supply device is inserted into the mold and parison. Insertion of the blow pin or other device may take place below the extrusion die head, or at a separate workstation to which the mold platens may be transported. Either arrangement is suitable and both are known in the extrusion blow molding art.

The parison is then inflated by introducing air through the blow pin or other device to expand the plastic material against the interior wall surfaces of the mold. In accordance with this invention, the mold halves are formed with complementary male and female surface portions, respectively, which serve to form, during blow molding, a press-lock closure in the first parison section which ultimately forms the open end of the container.

Specifically, the mold cavity is provided with a projecting rib extending about one-half of the cavity, and a rib receiving recess about the other half of the cavity. It will be understood that the projecting rib and complementary recess are formed along a continuous line adjacent what will eventually become the open end of the blow molded container.

The projecting rib formed on the one mold half will result in a substantially hollow, rib-like projection facing radially inwardly about one-half of the container, while the recess or groove formed in the other mold half will form a complementary recess facing radially inwardly about the other half of the container.

Upon subsequent removal from the mold, there is thus formed a unitary one piece container having a flexible, non-self-supporting upper portion provided with an integral press-lock closure, and a lower portion having self-supporting side walls and a bottom wall.

The rib and groove configuration are sized such that, when the open end of the finished container is flattened, the rib may be pressed into a friction fit or snap-fit type engagement with the opposed recess to close the container.

It will be understood, of course, that this invention, insofar as it relates to extrusion blow molding of an integral press-lock closure, is not limited to the container constructions disclosed in my co-pending application. In fact, the invention is applicable to the manufacture of virtually any single or multi-layer plastic container or enclosure which may be blow molded, and which is sufficiently flexible to permit the open end thereof to be drawn inwardly or flattened, to form, in effect, two sides which can be releasably locked by an arrangement as disclosed herein.

For example, the invention encompasses the manufacture of non-self-supporting plastic film bags by blow molding where the thickness of the bag adjacent the open end is increased to accommodate an integral press-lock closure. In addition, the invention encompasses the manufacture of self-supporting containers by blow molding, which containers are nevertheless sufficiently flexible to take advantage of the integral press lock closure of the invention. Such containers may be of uniform thickness, including the press lock area, or the latter may have a different thickness.

Thus, the invention provides a relatively simple and less costly process for forming flexible containers with integrally formed closures, which enable a container to be closed, opened and reclosed as desired. Other objects and advantages of the invention will become apparent from the detailed disclosure of the invention which follows.

DETAILED DESCRIPTION OF THE INVENTION

Figure 1:
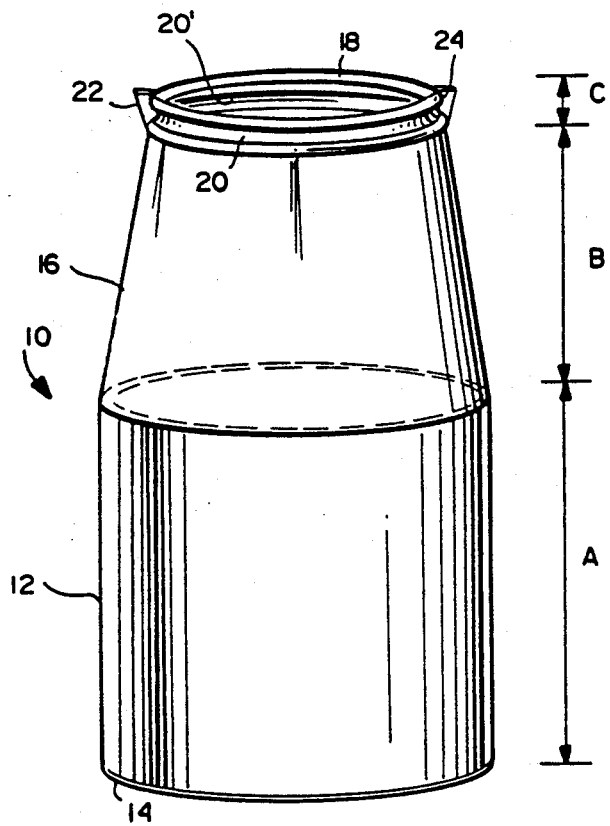
FIG. 1 is a perspective view of a plastic container formed in accordance with one exemplary embodiment of this invention.

With reference now to FIGS. 1-6, a multi-thickness, blow molded container with an integral press-lock closure is shown in accordance with a first exemplary embodiment of the invention. The container 10 is formed with a self-supporting, substantially cylindrical main body portion 12, a bottom wall 14, and an upper, non-self-supporting thin film portion 16. The upper, non-self-supporting film portion 16 terminates at an upper, open end 18 which is closable by a press-lock 20, 20' to be described in greater detail below. Tabs or ears 22, 24 are shown extending outwardly on either side of the press-lock area of the container. These tabs constitute flash or waste material which may or may not be formed during the blow molding process and which are later removed, as further described herein.

The container may be formed of suitable thermoplastic polymers including olefins, styrenics, polyesters, polyvinyls and aramids or other suitable thermoplastic polymers or elastomers. High density polyethylene (HDPE), low density polyethylene (LDPE), and polypropylene are particularly suitable. Moreover, the container may be formed of one or more layers of such material, laminated in a coextrusion process as well understood by those skilled in the art.

With reference specifically to FIG. 1, it may be seen that the container is formed with three axially distinct areas of different wall thicknesses, designated A, B and C. For example, the extrusion machine is adjusted and programmed to extrude a parison with a first thickness T1 in area A, a second thickness T2 in area B, and a third thickness T3 in area C. The thickness T1 in area A may be about 10 mil and above; the thickness T2 in area B may be between about 0.50 and 10 mil, and preferably between about 3 and 5 mil; and the thickness T3 in area C may also be about 10 mil and above, as in area A. During blow molding, areas A, B and C of the parison become, respectively, a self-supporting bottom section, a non-self-supporting and gatherable upper portion, and an integrally formed press lock portion at the upper open end of the container.

To the extent that the container of FIG. 1 is shown to include a self-supporting portion 12 and a non-self-supporting upper portion 16, the container is similar to that described in my earlier co-pending U.S. patent application Ser. No. 008,658. It is a feature of this continuation-in part application, that male and female press-lock elements may be blow molded, simultaneously with the blow molding of the container itself, to provide an effective closure at the open end of the container.

Figure 6:
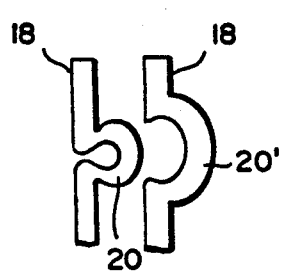
FIG. 6 is a partial cross sectional view illustrating in detail a press-lock closure in accordance with one embodiment of the invention.
Figure 7:
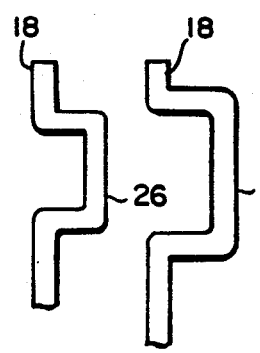
FIG. 7 is a partial cross-sectional view illustrating a press-lock closure in accordance with an alternative embodiment of the invention.

With reference now to FIGS. 6 and 7, exemplary embodiments of the press-lock feature are disclosed in detail. On one side of the container a substantially hollow rounded rib or bead 20 is formed just below the upper edge 18 of the container and extending about preferably one-half of the periphery thereof. On the opposite side thereof, a complementary hollow groove or recess 20' is formed about the other half of the container periphery. In other words, the rib and groove together extend substantially continuously about the periphery of the upper portion of the container, and adjacent the open end thereof. The arrangement is such that when the upper end of the container is flattened, the rib 20 lies directly opposite the groove 20', so that the rib may be pressed or snap fit into the recess 20' to effectively seal the container along its upper open edge. In FIG. 7, an alternative embodiment is disclosed wherein the press-lock is formed by a pair of rounded hollow rectangular portions 26, 26', respectively, which function to form a seal in the same manner as the embodiment described with respect to FIG. 6.

With specific reference again to FIGS. 1–3, it will be noted that the upper, non-self-supporting portion 16 is slightly tapered from an area between the self-supporting lower portion 12 and the upper open end 18. This arrangement is particularly advantageous because when the adjacent sides of the press-lock 20, 20' are engaged to seal the bag, the effective width of the upper end of the container will become enlarged or expand as the diameter of the upper end is collapsed to form a substantially straight line. By slightly tapering the upper, non-self-supporting portion 16 as shown in FIG. 1, the bag assumes, upon closing or sealing, a lateral dimension no greater than the diameter of the main body portion 12, as best seen in FIG. 3.

This aspect of the invention may also be explained with reference to FIG. 2 which is a schematic top view of the open container illustrated in FIG. 1. Thus, the open end of the upper portion 16 assumes an elliptical shape. In one example of such a container, the diameter of the lower portion of the container may be about 6.50 inches. By tapering the upper portion, a substantially elliptical opening may be formed at the upper open end, having a major axis X of about 5.8 inches and a minor axis Y of about 2.4 inches. The curves defining the substantially elliptical shape, lie on radii of about 4.1 inches. With this arrangement, when the rib 20 and recess 20' are engaged, transforming the substantially elliptical shape to a substantially straight line, the width of the upper portion of the container expands along the upper open end thereof to substantially correspond to the diameter of the lower portion, as may be appreciated from FIGS. 3 and 4. FIG. 4 also shows the container in final product form, with flash ears 22, 24, if indeed formed during blow molding, removed.

Figure 2:
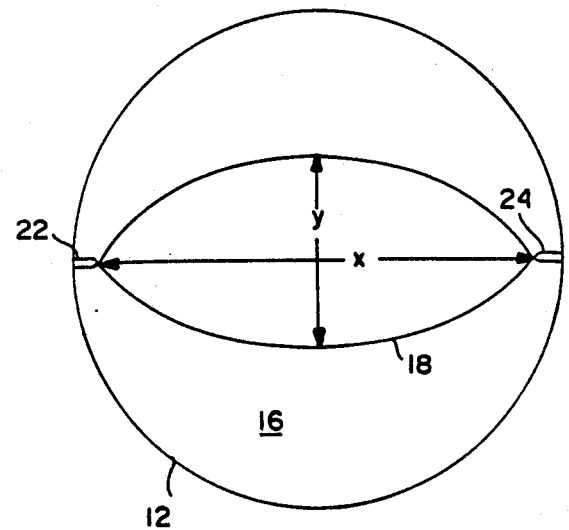
FIG. 2 is a schematic top view of the container illustrated in FIG. 1.
Figure 3:
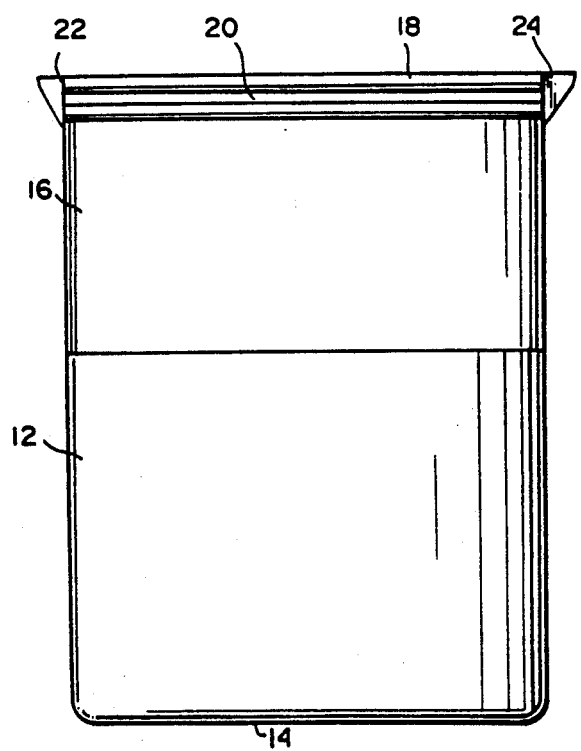
FIG. 3 is a side view of the container illustrated in FIG. 1, but wherein the upper end of the container has been flattened and closed along its upper edge.
Figure 4:
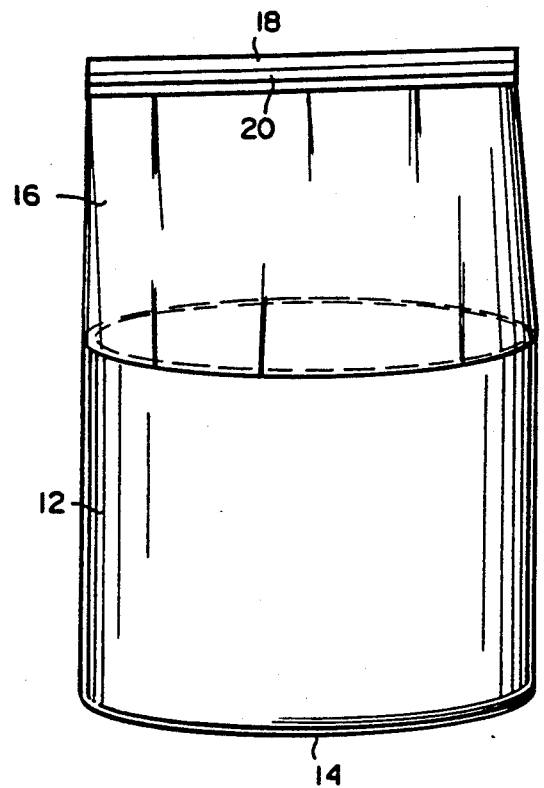
FIG. 4 is a perspective view of the container illustrated in FIG. 3.
Figure 5:
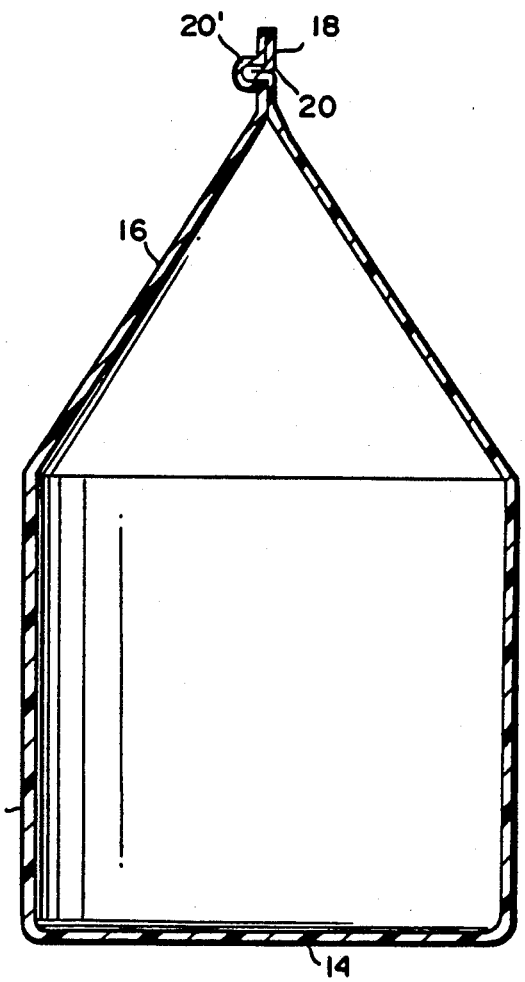
FIG. 5 is a side cross-sectional view of the container illustrated in FIG. 4.

FIG. 5 is a side cross-sectional view of a container, such as that illustrated in FIGS. 1–3, further indicating the manner in which press-lock portions 20, 20' have been frictionally engaged to create a sealed closure along the upper edge 18 of the container.

While the container illustrated in FIGS. 1 through 5 is shown to have a substantially cylindrical, self-supporting bottom portion 12, it will be appreciated that other shapes may be formed during blow molding. For example, if vertical nesting of a plurality of containers is considered desirable, bottom portion 12 may be formed with a slightly outwardly directed taper, in the upward direction.

Figure 8:
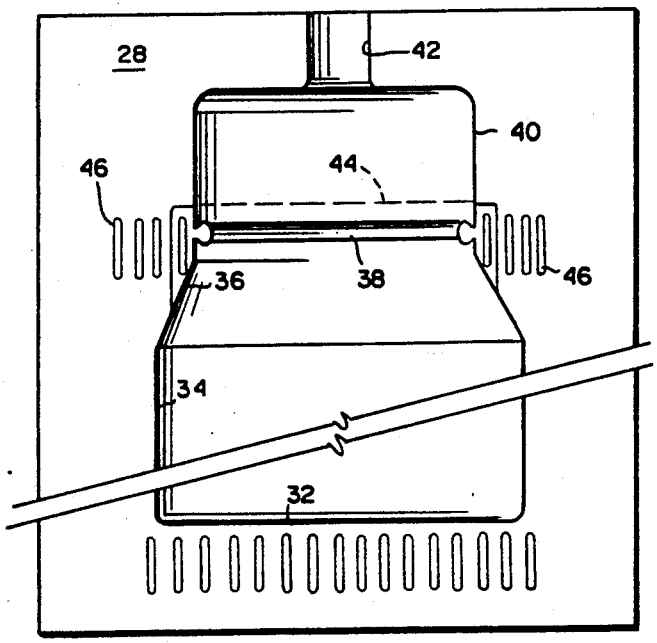
FIGS. 8 and 9 are side views of split mold halves which form a blow mold cavity in which a container of the general type illustrated in FIG. 1 may be formed.
Figure 9:
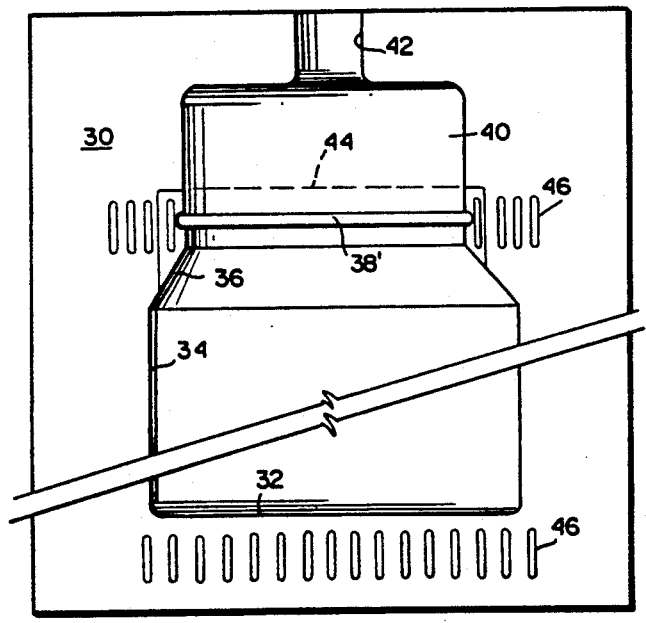

With reference now to FIGS. 8 and 9, male and female mold halves are illustrated which are used in the blow molding process of this invention, to form the containers generally of the type illustrated in FIGS. 1–7. The mold halves 28, 30 together define a cavity provided with surfaces which define the shape of the final blow molded product. Thus, mold half 28 includes a surface 32 which forms the bottom wall of the container, a cylindrical surface 34 which forms the lower self-supporting body portion of the container, a tapered surface 36 which forms the upper non-self-supporting portion 16 of the container, and a rounded groove or recess 38' which extends laterally across the mold half, and which forms a hollow recess 20' of the type illustrated in FIGURE 6.

An upper portion 40 is provided in the mold leading to an opening 42 through which a blow pin is inserted to introduce air or other suitable gas under pressure to blow mold the container within the closed mold cavity formed by mold halves 28, 30.

The mold half 30 is identical to the mold half 28 in every respect with the exception that mold half 30 is configured to include a projecting rib portion 38 which forms a substantially hollow bead or rib 20, as also illustrated in FIG. 6.

The dotted line 44 shown in both mold halves 28 and 30 illustrates a cutting line about which the finished container is cut to separate it from the original parison. In other words, the area above the dotted line 44 is waste or flash material removed after the container forming operation, and which may be recycled and reused. Thus, line 44 also corresponds to the upper edge defining the open end 18 of the finished container.

In both mold halves, flash recesses 46 are provided to accommodate the flow of material during the pinching off operation of the parison during closing of the mold halves.

Figure 10:
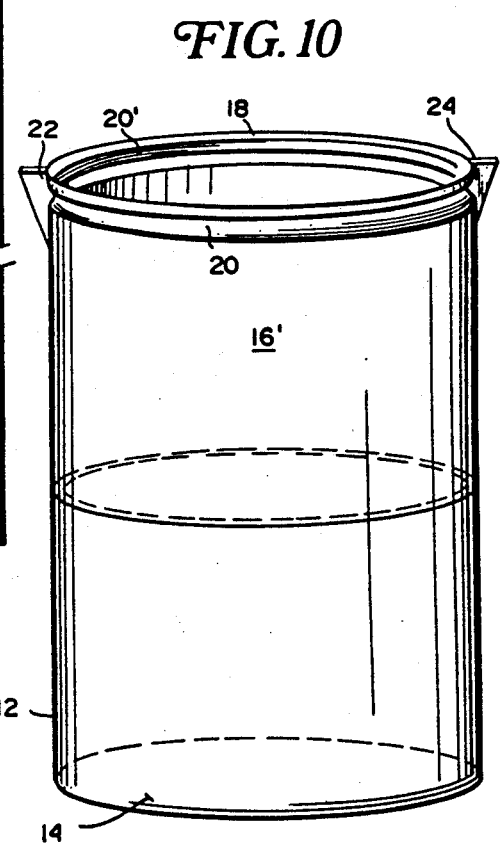
FIG. 10 is a perspective view of a container formed in accordance with another exemplary embodiment of the invention.
Figure 11:
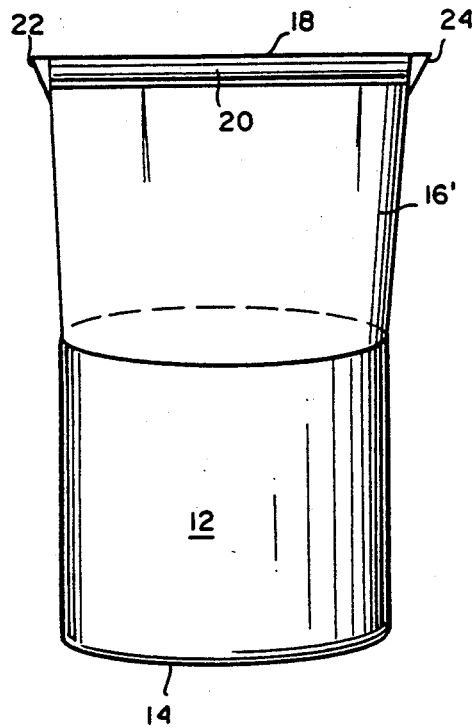
FIG. 11 is a perspective view of the container illustrated in FIG. 10, but wherein the upper free end of the container has been flattened and closed in accordance with the invention.

FIGS. 10 and 11 illustrate another embodiment of the invention wherein a blow molded container is formed initially with a flexible, non-self-supporting portion 16' having a generally cylindrical shape, i.e., with the upper end of the container open, the side walls of the upper non-self-supporting portion assume a continuous cylindrical shape with respect to the lower self-supporting portion 12. Of course, it will be further understood that upon closing of the container illustrated in FIG. 10 in the manner previously described, the upper edge portion 18 will flatten to a substantially straight line length exceeding the original diameter of the container, as best seen in FIG. 11. The mold halves for forming this embodiment will be similar to mold halves 28, 30 with the exception that the upper portion of the mold cavity will be cylindrical rather than tapered.

Figure 12:
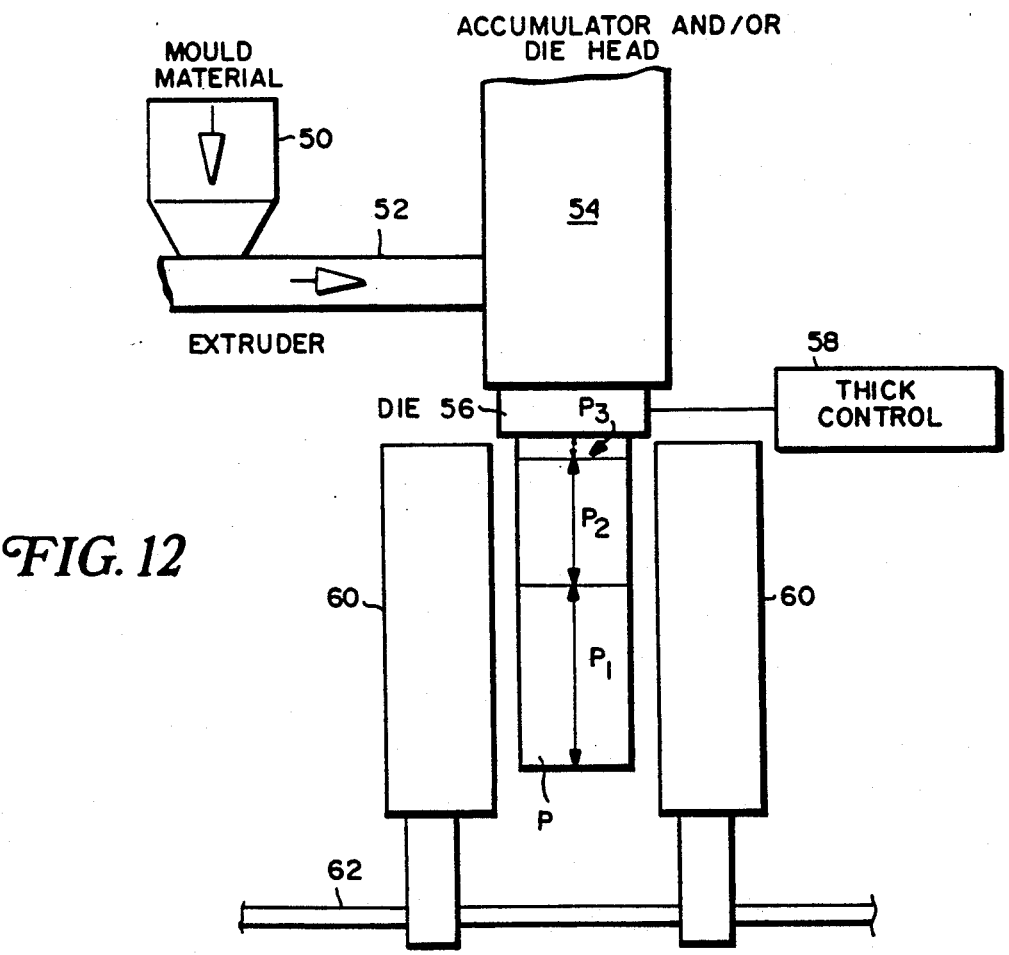
FIG. 12 is a schematic view of an extrusion and blow molding apparatus for use in forming containers in accordance with this invention.

Referring now to FIG. 12, there is provided a schematic illustration of an extrusion and blow molding apparatus useful in the manufacture of the containers described above. Plastic material is disposed in a hopper 50 which feeds the material to an extruder 52 where it is plasticized and transported to an accumulator and/or die head 54 provided with a die 56. Die 56 includes a variable width slit in the general shape of a circle. The wall thickness of the parison extruded from die 56 and, ultimately, the finished container may thus be regulated by a conventional thickness control indicated by 58.

Below the die 56 are located a pair of mold carrying platens 60 movable toward and away from one another along suitable guide 62. Preferably, a hydraulic mechanism, not shown, is used to move the mold platens 60 vertically into position on either side of the parison P, and then toward and away from one another to clamp the parison within the mold, and to subsequently release the blow molded container. The mold platens carry mold halves which define a mold cavity as described hereinabove with respect to FIGS. 8 and 9.

In operation, plastic material is extruded through the die head 54 to form the parison P. During extrusion, the thickness control 58 is adjusted to produce parison section designated P1, P2 and P3, having thicknesses T1, T2 and T3, corresponding to the areas A, B, and C of the container side wall illustrated in FIG. 1.

After the mold platens 60, 60 have been shuttled to the proper position adjacent the parison P, they are brought together to clamp the parison within the mold. If the blow gas is to be introduced through the extrusion die head, the mold and clamped parison remain in this position for the blow molding operation. Other arrangements, however, are equally suitable. For example, after clamping, the parison may be severed just above the mold, and the mold thereafter shuttled to a separate station where the blow pin is introduced into the mold through the opening created by the severance of the parison.

In any event, once the blow device is inserted within the mold cavity, pressurized air or gas is introduced into the parison, causing the latter to expand outwardly against all interior surfaces within the mold, including the rib or bead such as 20 or 38, and complementary groove or recess 20' or 38'.

It will be understood that expansion of the parison "draws down" or thins the plastic material, and this thinning action must be taken into account when determining the thicknesses T1, T2 and T3 for initially extruding the parison.

Once the expansion is completed, the parison is allowed to cool and the mold halves are thereafter separated to release the product. The product is thereafter trimmed in any suitable manner to remove flash as well as the portion of the container extending above line 44 of the mold cavity.

The resulting container product is characterized by a stable, self-supporting base and an upper, flexible, thin film portion provided at its free end with a press-lock closure which may be closed and opened as desired.

As previously noted, the blow molded press-lock feature of this invention may be incorporated into container constructions other than those specifically disclosed in this, and my above referenced co-pending application.

For example, a thin film plastic bag may be blow molded in accordance with this invention, to include an integral press-lock. In this construction, the parison is extruded to have a thicker portion only adjacent what will become the open end of the finished bag. This thicker area permits an integral press-lock closure, as described above, to be formed in the bag during the subsequent blow molding step.

In addition, the invention contemplates manufacture of a self-supporting container by blow molding, but wherein the container is nevertheless sufficiently flexible to permit the open end to be drawn inwardly and/or flattened so as to permit the utilization of an integral press-lock closure as described herein. The thickness of such a container (which for some materials may be as great as 0.050") may be uniform throughout, or may differ in the area of the integral press-lock closure.

In addition, as in my co-pending application, the present invention contemplates that the parison be made by conventional co-extrusion processes whereby any number of layers or material may be utilized to form the upper and lower portions of the container. Thus, for example, one or more different materials can be utilized to make the upper and lower portions. This method of production would be useful, for example, in making food containers. In such an application, the outer layer(s) of the lower portion could be made from plastic to give structural strength while the inner layer(s) could be made from FDA approved food grade plastic or other non-plastic materials. Of course, in order to make multiple layers, it will be necessary to utilize multiple extruders and accumulators. Such co-extrusion processes are well-known in the art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of forming an open-ended, closeable plastic container comprising the steps of:
   (a) extruding one or more plastic materials to form a tubular parison having at least one end portion of a first predetermined thickness and a remaining portion wherein at least part of said remaining portion has a thickness less than said at least one end portion;
   (b) providing a blow mold comprising a pair of mold halves which together define a mold cavity having interior surfaces and including male closure forming surfaces on one of said pair of mold halves, and complementary female closure forming surfaces on the other of said pair of mold halves, wherein the male and female closure forming surfaces are located directly opposite each other and adjacent one end of said mold cavity; and
   (c) blow molding the parison into engagement with the interior surfaces of said mold cavity so that said one end portion of said parison engages said male and female closure forming surfaces to form a container with a hollow male closure component and an opposed, complementary female closure component, said male and female closure components adapted in use to be pressed into interfitting engagement to seal the container closed.

2. A method according to claim 1 wherein said container comprises a non-self-supporting, thin film plastic bag of about 10 mil or less in thickness.

3. A method according to claim 1 wherein said container is substantially self-supporting.

4. A method according to claim 1 wherein said substantially hollow male and female closure components comprise a rounded rib and rounded groove, respectively.

5. A method according to claim 1 wherein said substantially hollow male and female closure components are rectangular in shape.

6. A method of extrusion blow molding a unitary open-ended, closable plastic container having first, second and third side wall portions, and a bottom wall comprising the steps of:
   extruding one or more plastic materials to form a parison having a first portion of a first predetermined thickness, a second portion of a second predetermined thickness different than said first thickness, and a third portion of a third predetermined thickness different than said second predetermined thickness, such that the first parison portion has a thickness sufficient to form an integral closure in said first parison portion, the second parison portion has a thickness sufficiently small to form said second portion as a flexible, non-self-supporting portion, and the third parison portion has a thickness sufficient to render the side walls of the third portion self-supporting, disposing the first, second and third parison portions in a blow mold having a mold cavity provided with surface means for forming said integral closure, said surface means including an elongated groove in one-half of said blow mold cavity adjacent one end thereof, and an elongated projection in the other half of said blow mold cavity, adjacent said one end, wherein said projection is located directly opposite said elongated groove; and blow molding the parison portions to form said container wherein said elongated groove and projection are engaged by said first portion of the parison during the blow molding step to form opposed, complementary, substantially hollow male and female closure components.

7. A method according to claim 6 wherein the first parison portion and the third parison portion have substantially equal thicknesses.

8. A method according to claim 6 wherein the parison descends from a die head such that the third parison portion is the first extruded portion.

9. A method according to claim 6 wherein said surface means for forming said integral closure includes an elongated groove in one-half of said blow mold adjacent one end thereof; and an elongated projection in the other half of said blow mold, an elongated projection directly opposite said elongated groove, and wherein said elongated groove and projection are engaged by said first portion of the parison during the blow molding step.

10. A method according to claim 6 wherein said elongated groove and projection are shaped to provide a snap-fit engagement between opposing halves of said container adjacent the open end thereof.

11. A method according to claim 6 wherein said first parison portion has a thickness in the range of at least about 10 mil; said second parison portion has a thickness in the range of about 3 to about 5 mil; and said third parison portion has a thickness greater than said second parison portion.

12. A method according to claim 11 wherein said third parison portion has a thickness in the range of at least about 10 mil.

13. A method according to claim 6 wherein said plastic enclosure is formed of a thermoplastic material.

14. A method according to claim 13 wherein said thermoplastic material is selected from the group comprising olefins, styrenics, polyesters, polyvinyls and aramids.

15. A method according to claim 6 wherein said parison is formed of multiple layers and wherein said layers are coextruded.

* * * * *